United States Patent
Wang et al.

(10) Patent No.: US 10,087,782 B2
(45) Date of Patent: Oct. 2, 2018

(54) ENGINE MID-TURBINE FRAME TRANSFER TUBE FOR LOW PRESSURE TURBINE CASE COOLING

(71) Applicant: United Technologies Corporation, Hartford, CT (US)

(72) Inventors: Cheng-Zhang Wang, Glastonbury, CT (US); Jorn A. Glahn, Manchester, CT (US); David F. Cloud, Simsbury, CT (US); Peter M. Munsell, Granby, CT (US); Clifton J. Crawley, Jr., Glastonbury, CT (US); Robert Newman, Harwinto, CT (US); Michelle Diana Stearns, Mansfield, CT (US)

(73) Assignee: United Technologies Corporation, Farmington, CT (US)

( * ) Notice: Subject to any disclaimer, the term of this patent is extended or adjusted under 35 U.S.C. 154(b) by 280 days.

(21) Appl. No.: 14/773,876

(22) PCT Filed: Mar. 12, 2014

(86) PCT No.: PCT/US2014/023949
§ 371 (c)(1),
(2) Date: Sep. 9, 2015

(87) PCT Pub. No.: WO2014/175969
PCT Pub. Date: Oct. 30, 2014

(65) Prior Publication Data
US 2016/0032775 A1    Feb. 4, 2016

Related U.S. Application Data

(60) Provisional application No. 61/835,719, filed on Jun. 17, 2013, provisional application No. 61/778,611, filed on Mar. 13, 2013.

(51) Int. Cl.
| | |
|---|---|
| *F01D 25/24* | (2006.01) |
| *F01D 25/00* | (2006.01) |
| *F01D 9/06* | (2006.01) |
| *F01D 25/16* | (2006.01) |
| *F01D 9/04* | (2006.01) |
| *F02C 7/18* | (2006.01) |

(52) U.S. Cl.
CPC ............ *F01D 25/24* (2013.01); *F01D 9/041* (2013.01); *F01D 9/065* (2013.01); *F01D 25/162* (2013.01);
(Continued)

(58) Field of Classification Search
CPC ........ F01D 25/24; F01D 25/162; F01D 9/041; F01D 9/065; F02C 7/18; F05D 2240/14;
(Continued)

(56) References Cited

U.S. PATENT DOCUMENTS

| 4,321,007 A | 3/1982 | Dennison et al. |
|---|---|---|
| 5,048,288 A * | 9/1991 | Bessette ................. F01D 11/24 415/116 |

(Continued)

FOREIGN PATENT DOCUMENTS

| EP | 2264282 A2 | 12/2010 |
|---|---|---|
| EP | 2573329 A2 | 3/2013 |

OTHER PUBLICATIONS

Supplemental Partial European Search Report for EP Application No. 14787748.4 dated Dec. 6, 2016.
(Continued)

*Primary Examiner* — Laert Dounis
*Assistant Examiner* — Kelsey Stanek
(74) *Attorney, Agent, or Firm* — Carlson, Gaskey & Olds, P.C.

(57) ABSTRACT

A turbine engine includes a turbine section with a low pressure turbine and a turbine case disposed about an axis.
(Continued)

A frame assembly defines an outer cavity and an inner cavity with the outer cavity including at least one opening configured and adapted to communicate cooling air to the turbine case. A transfer tube is disposed within the outer cavity and is configured and adapted to receive cooling air. The transfer tube includes a bend configured to impart circumferential velocity to the cooling air within the outer cavity.

16 Claims, 7 Drawing Sheets

(52) U.S. Cl.
CPC ............ *F02C 7/18* (2013.01); *F05D 2240/14* (2013.01); *F05D 2260/14* (2013.01); *F05D 2260/20* (2013.01); *F05D 2260/2212* (2013.01); *F05D 2260/97* (2013.01); *Y02T 50/676* (2013.01)

(58) Field of Classification Search
CPC ............ F05D 2260/14; F05D 2260/20; F05D 2260/2212; F05D 2260/97; Y02T 50/676
USPC .................................................. 415/116, 115
See application file for complete search history.

(56) References Cited

U.S. PATENT DOCUMENTS

| | | | |
|---|---|---|---|
| 5,292,227 A | 3/1994 | Czachor et al. | |
| 5,351,732 A * | 10/1994 | Mills | F01D 11/24 |
| | | | 415/115 |
| 5,630,703 A | 5/1997 | Hendley et al. | |
| 8,366,382 B1 | 2/2013 | Muldoon et al. | |
| 8,371,127 B2 | 2/2013 | Durocher et al. | |
| 2003/0233834 A1 | 12/2003 | Boeck | |
| 2007/0065274 A1 | 3/2007 | Birrell et al. | |
| 2008/0232953 A1 | 9/2008 | Guimbard et al. | |
| 2008/0253884 A1* | 10/2008 | Snyder | F01D 25/26 |
| | | | 415/208.1 |
| 2010/0303610 A1* | 12/2010 | Wang | F01D 5/18 |
| | | | 415/115 |
| 2011/0079019 A1* | 4/2011 | Durocher | F01D 5/082 |
| | | | 60/796 |
| 2011/0135456 A1* | 6/2011 | Takahashi | F01D 11/24 |
| | | | 415/180 |
| 2011/0138819 A1 | 6/2011 | Tanimura | |
| 2013/0078080 A1 | 3/2013 | Durocher et al. | |
| 2014/0119880 A1* | 5/2014 | Rodriguez | F01D 9/065 |
| | | | 415/1 |

OTHER PUBLICATIONS

International Search Report and Written Opinion for International Application No. PCT/US2014/023949 dated Nov. 18, 2014.
International Preliminary Report on Patentability for International Application No. PCT/US2014/023949 dated Sep. 24, 2015.
Extended European Search Report for application No. 17210986.0. dated Jun. 19, 2018.

* cited by examiner

ENGINE MID-TURBINE FRAME TRANSFER TUBE FOR LOW PRESSURE TURBINE CASE COOLING

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A mid-turbine frame is sometimes provided between the high pressure turbine and the low pressure turbine to aid in supporting bearing assemblies. The low pressure turbine case requires cooling air to maintain temperatures within a desired limit. Cooling air is extracted from the compressor section and routed to a cavity within the mid-turbine frame. Cooling air from the cavity within the mid-turbine frame is then routed to cool the low pressure turbine case. In some applications, the mid-turbine frame is at a temperature such that cooling air within the cavity is heated above a temperature capable of sufficiently cooling the low pressure turbine case.

Accordingly, it is desirable to design and develop cooling features and systems for maintaining desired temperatures within the turbine case.

SUMMARY

A turbine engine according to an exemplary embodiment of this disclosure, among other possible things includes a turbine section including a low pressure turbine and a turbine case disposed about an axis. A frame assembly defines an outer cavity and an inner cavity. The outer cavity includes at least one opening configured and adapted to communicate cooling air to the turbine case. A transfer tube is disposed within the outer cavity configured and adapted to receive cooling air delivered thereto. The transfer tube includes a bend configured to impart circumferential velocity to the cooling air within the outer cavity.

In a further embodiment of the foregoing turbine engine, further includes a supply tube for delivering cooling air to the outer cavity of the frame assembly. The transfer tube includes an axial portion in communication with the supply tube and the bend.

In a further embodiment of any of the foregoing turbine engines, the axial portion extends aft from the supply tube in a direction substantially parallel to the axis.

In a further embodiment of any of the foregoing turbine engines, the transfer tube includes an opening disposed within a distal end of the bend.

In a further embodiment of any of the foregoing turbine engines, the bend is disposed at an angle between about 30° and about 89° degrees relative to the axis.

In a further embodiment of any of the foregoing turbine engines, further includes a compressor section in communication with the supply tube for supplying cooling air to the frame assembly.

In a further embodiment of any of the foregoing turbine engines, the compressor section includes a high pressure compressor and the cooling air is obtained from a front stage of the high pressure compressor.

In a further embodiment of any of the foregoing turbine engines, the turbine section includes a high pressure turbine and the frame is a mid-turbine frame which defines a flow path between the high pressure turbine and the low pressure turbine.

A frame assembly for a turbine engine according to an exemplary embodiment of this disclosure, among other possible things includes a plurality of vane struts extending radially outward relative to an axis, an outer cavity which includes an opening for communicating cooling air to a turbine section of the turbine engine, and a transfer tube within the outer cavity configured and adapted to receive cooling air. The transfer tube includes a bend relative to the engine axis to impart circumferential velocity into cooling air within the outer cavity for maintaining a desired temperature of the cooling air within the outer cavity.

In a further embodiment of the foregoing frame assembly, includes a supply tube for delivering cooling air to the transfer tube. The transfer tube includes an axial portion in communication with the supply tube and the bend.

In a further embodiment of any of the foregoing frame assemblies, the axial portion extends aft from the supply tube in a direction substantially parallel to the engine axis.

In a further embodiment of any of the foregoing frame assemblies, the transfer tube includes an opening disposed within a distal end of the bend.

In a further embodiment of any of the foregoing frame assemblies, the bend is disposed at an angle within a range of between about 30° and about 89° degrees relative to the engine axis.

In a further embodiment of any of the foregoing frame assemblies, includes an inner cavity radially inward of the plurality of vane struts. The inner cavity is in communication with the outer cavity.

In a further embodiment of any of the foregoing frame assemblies, the opening for communicating cooling air to the turbine section include a plurality of openings disposed circumferentially within the outer cavity.

In a further embodiment of any of the foregoing frame assemblies, includes a feather seal leak path defined between the outer cavity and the turbine section for supplying cooling air to the turbine section.

In a further embodiment of any of the foregoing frame assemblies, the supply tube includes at least two supply tubes communicating cooling air to the outer cavity and the transfer tube includes at least two transfer tubes in communication with a corresponding supply tube.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
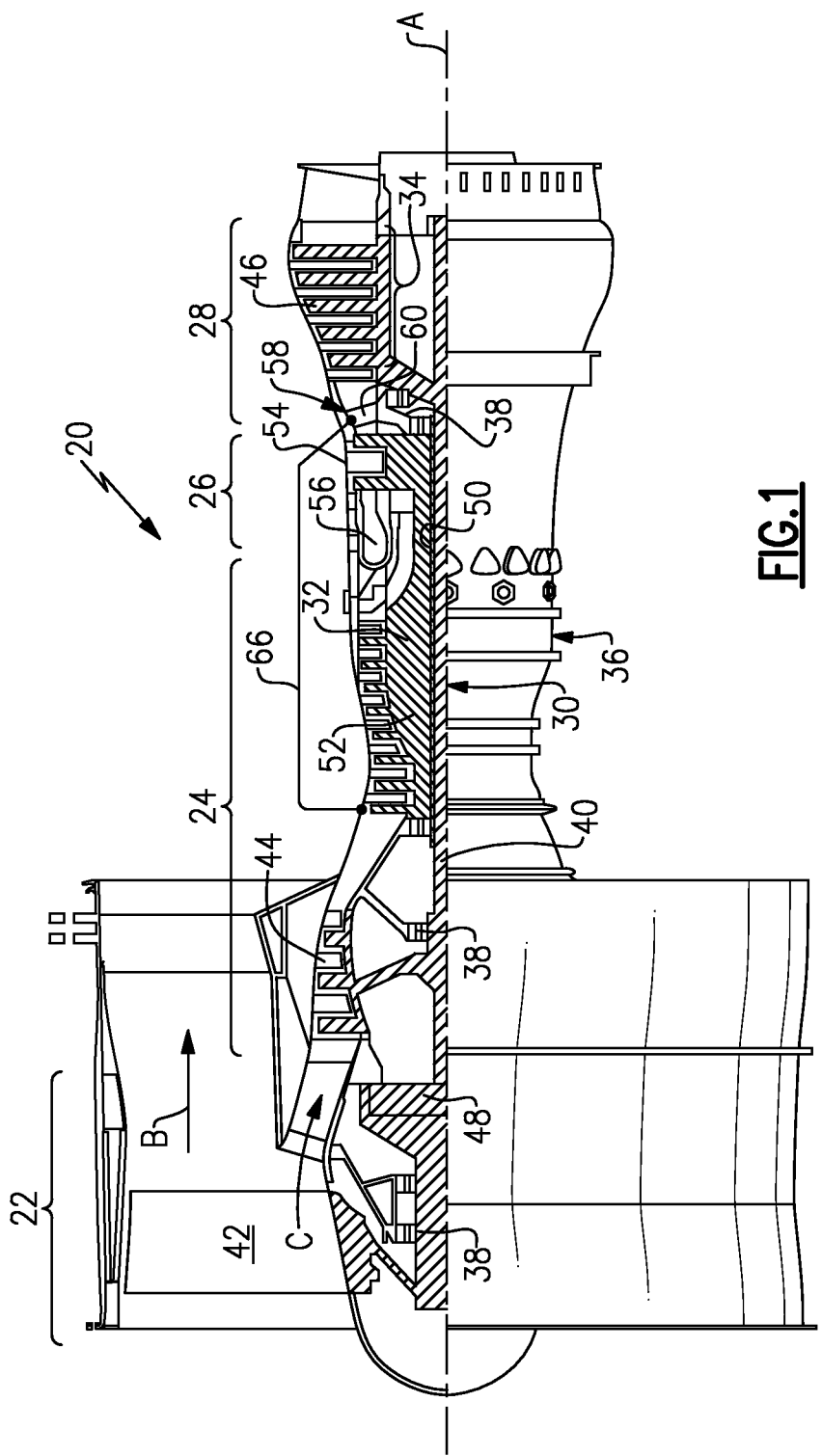
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame assembly 58 of the engine static structure 36 is arranged generally between the high pressure turbine 54 and the low pressure turbine 46. The mid-turbine frame assembly 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46.

The mid-turbine frame assembly 58 includes vanes 60, which are in the core airflow path C and function as an inlet guide vane for the low pressure turbine 46. Temperatures of the exhaust gases are such that cooling of the mid-turbine frame assembly 58 may be required. A low temperature cooling air flow (LTCA) supply tube 66 communicates relatively cool air from the compressor section 24 to the turbine section 28. In this example, the supply tube 66 communicates relatively low temperature cooling air 18 from one of the initial stages of the high pressure compressor 52 to the mid-turbine frame assembly 58.

Utilizing the vane 60 of the mid-turbine frame assembly 58 as the inlet guide vane for low pressure turbine 46 decreases the length of the low pressure turbine 46 without increasing the axial length of the mid-turbine frame assembly 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
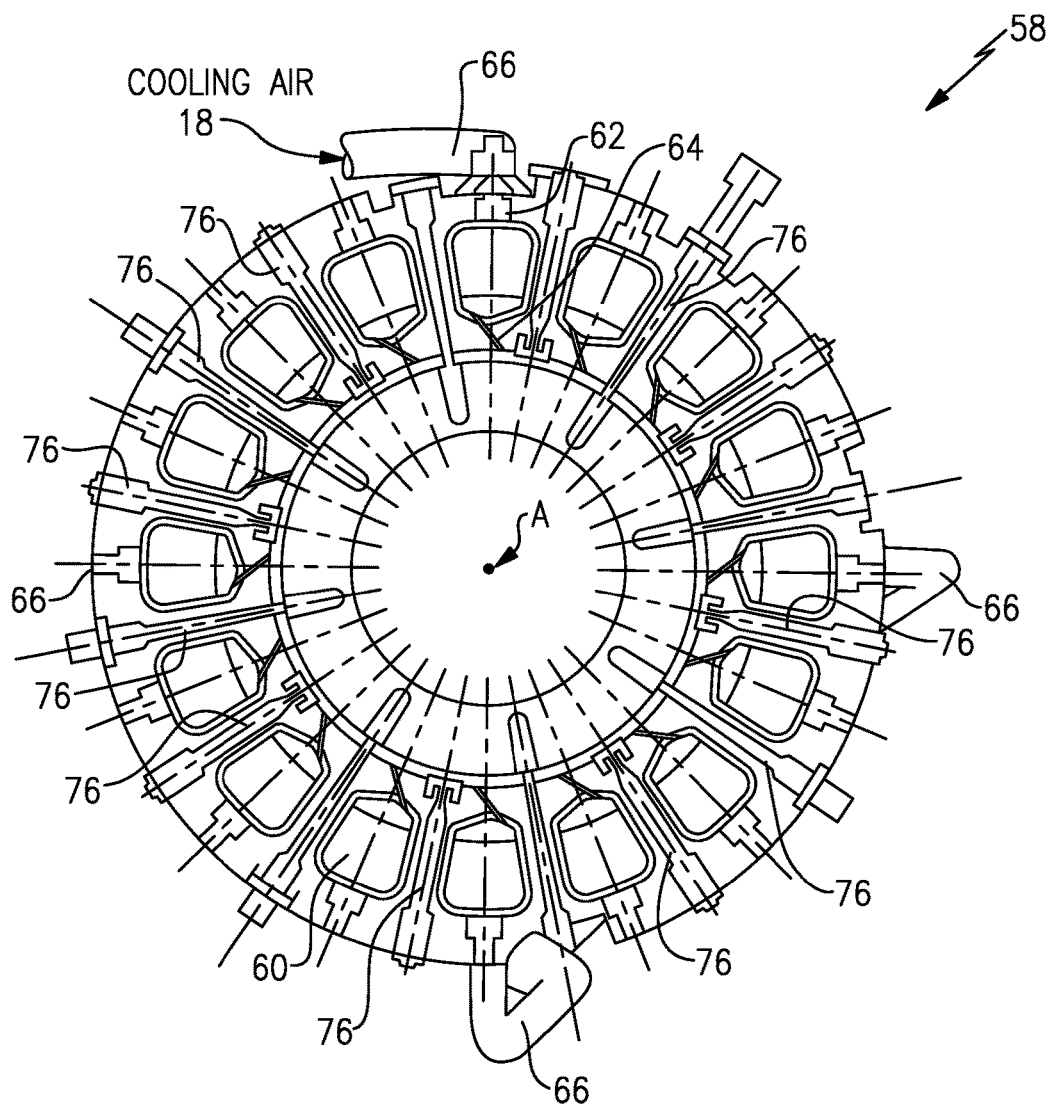
FIG. 2 is an axial section view of an example mid-turbine frame assembly.
Figure 3:
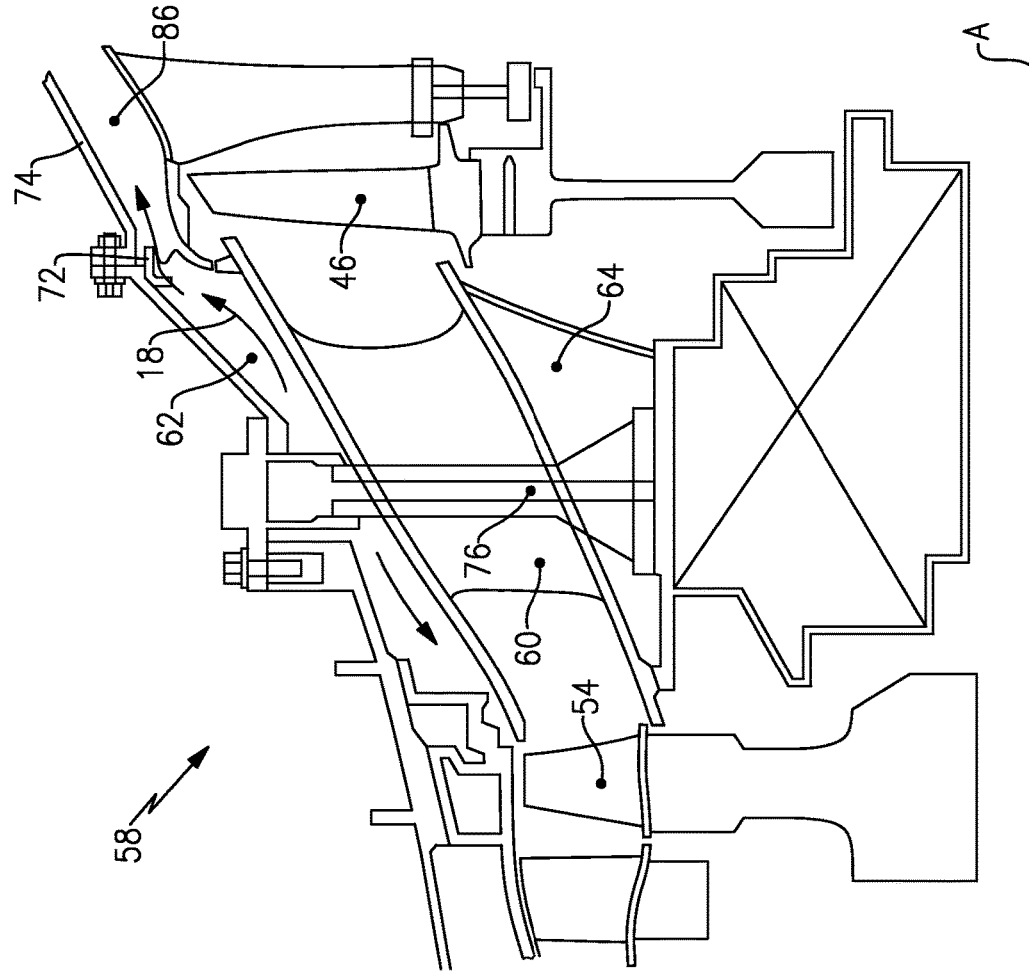
FIG. 3 is a sectional view of a portion of the example mid-turbine frame assembly.
Figure 4:
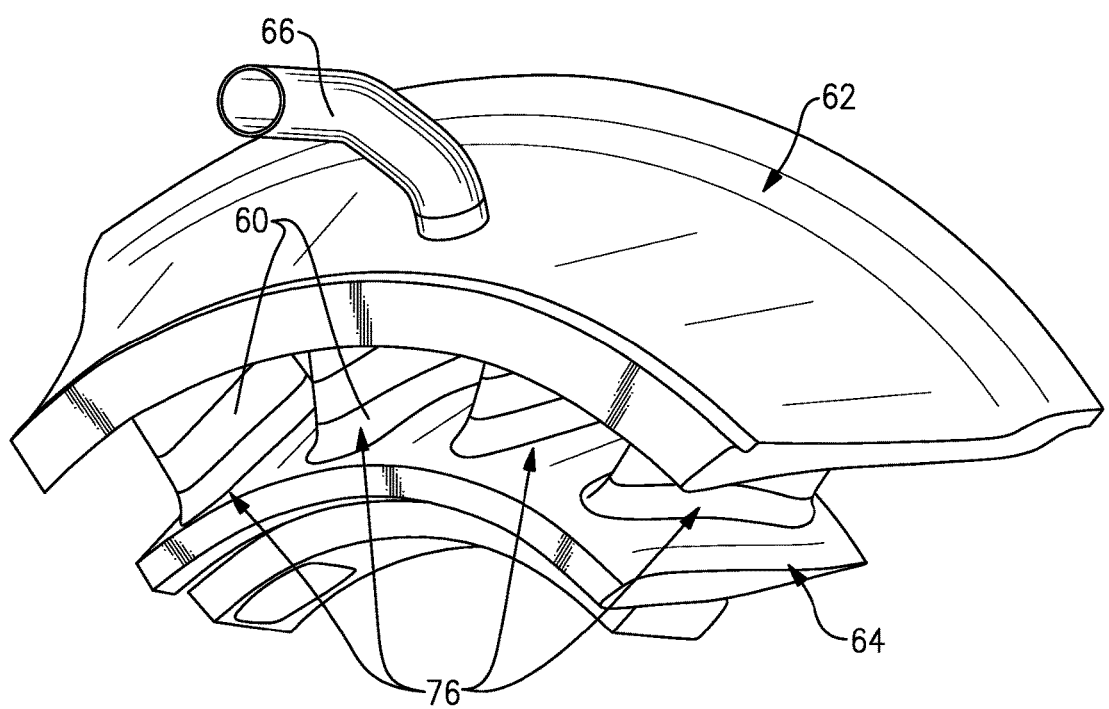
FIG. 4 is a perspective view of a portion of an outer cavity of the mid-turbine frame assembly.

Referring to FIGS. 2, 3 and 4 an example mid-turbine frame assembly 58 includes an outer cavity 62 and an inner cavity 64. The outer cavity 62 is disposed radially outward of the airfoils 60 and the inner cavity 64 is disposed radially inward of the airfoils 60. Several LTCA supply pipes 66 deliver cooling air from the compressor section 24 to the outer cavity 62. In this example, four (4) supply tubes 66 are arranged ninety (90) degrees apart about the circumference of the mid-turbine vane assembly 58. As appreciated, different numbers of supply tubes 66 could be utilized in different locations about the mid-turbine vane assembly 58. In this example, cooling air 18 is extracted from an initial stage of the high pressure compressor 52. As appreciated, cooling air may be obtained from other portions of the engine 20 that include air at appropriate pressures and temperatures.

The mid-turbine frame assembly 58 includes a plurality of airfoils 60 and vane struts 76 arranged circumferentially about the engine axis A. The airfoils 60 define passages between the high pressure turbine 54 and the low pressure turbine 46. The vane struts 76 provide support for structures such as bearings supported radially inward of the airfoils 60. The outer cavity 62 and inner cavity 64 are provided with cooling air 18 that is circulated from the outer cavity 62 to the inner cavity 64 through openings between the airfoils 60 and vane struts 76.

The cooling air 18 is communicated through the outer cavity 62 to a low pressure turbine (LPT) cavity 86 defined within a turbine case 74 (FIG. 3) through a plurality of supply holes 72. Cooling air 18 may also be communicated to the LPT cavity 86 through a feather seal 72 defined at an aft portion of the outer cavity 62. The mid-turbine frame assembly 58 is very hot and therefore the temperature of the cooling air 18 provided to cool the low pressure turbine case 74 may require additional cooling features to provide a flow of a desired temperature determined to provide the desired cooling of the low pressure turbine 46.

Figure 5:
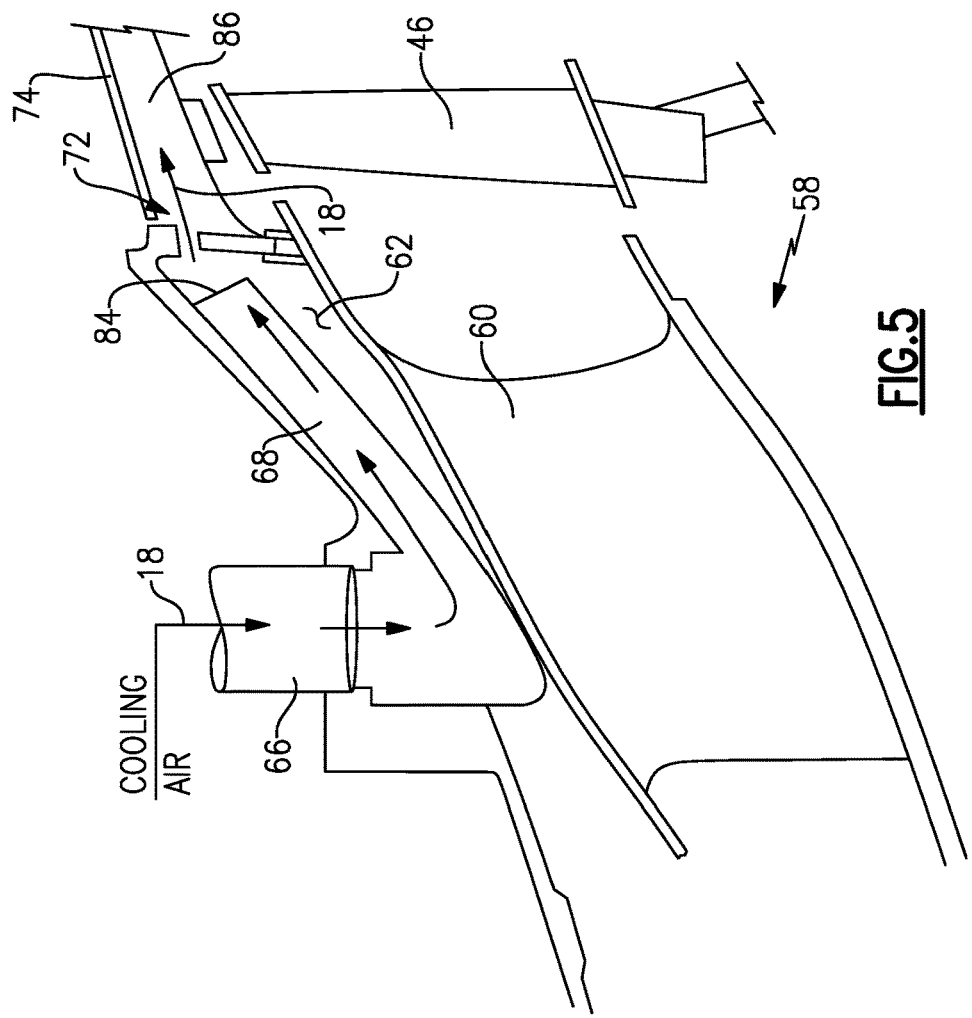
FIG. 5 is a schematic view of the outer cavity and example supply and transfer tubes.
Figure 6:
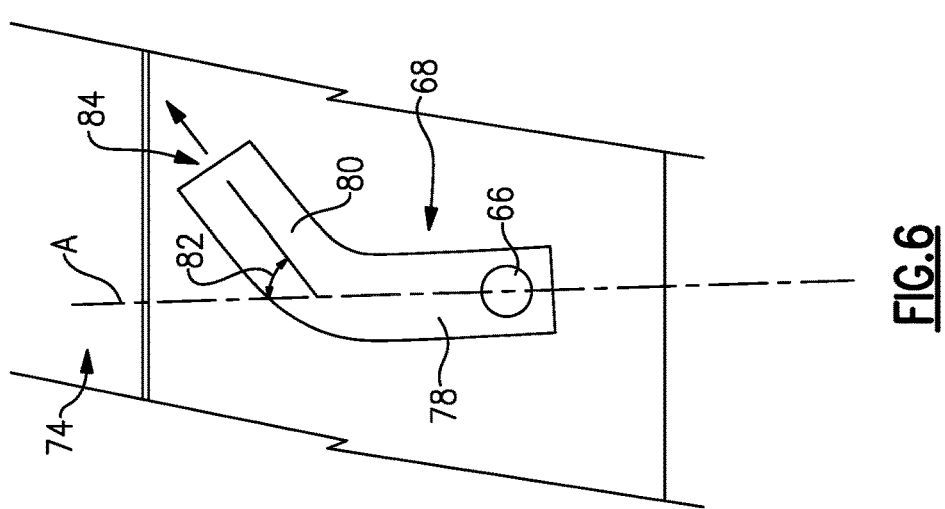
FIG. 6 is a top schematic view of the example transfer tube.
Figure 7:
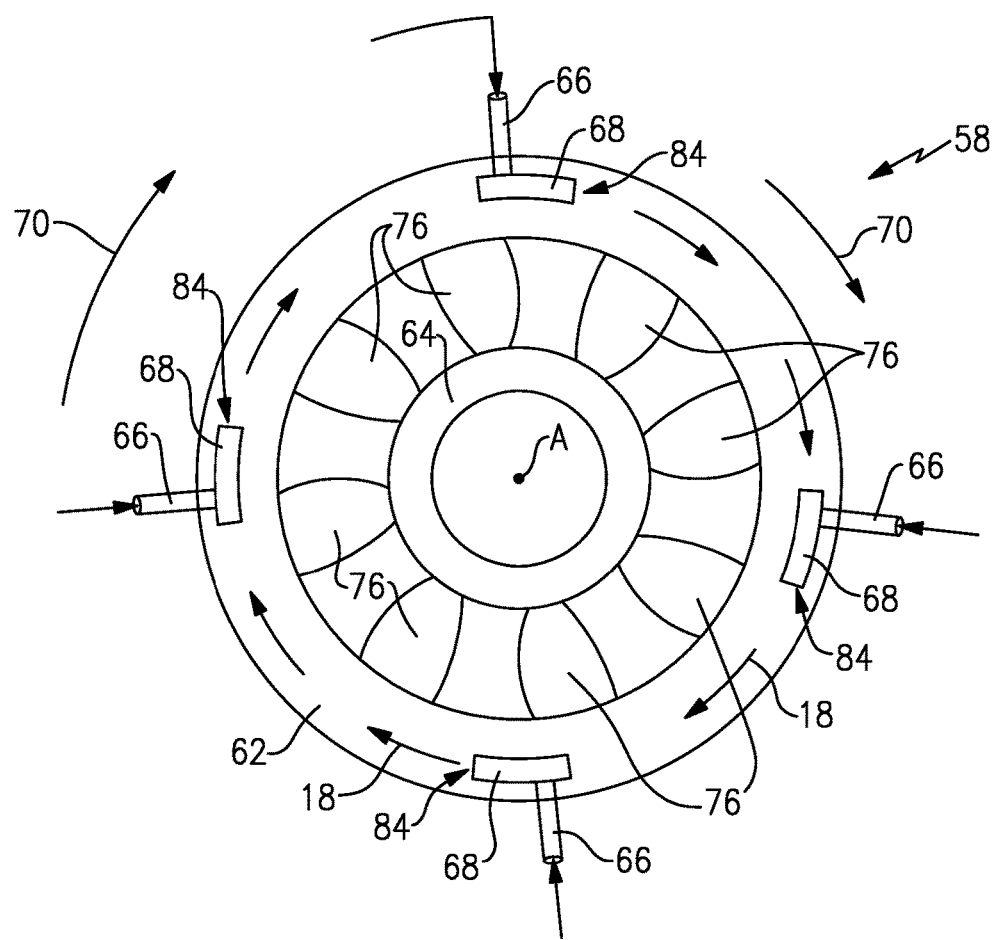
FIG. 7 is a sectional view of cooling airflow within the example mid-turbine frame assembly.

Referring to FIGS. 5, 6, and 7, the supply pipe 66, communicates cooling air flow 18 to a transfer tube 68. The transfer tube 68 includes an outlet 84 for cooling air entering the outer cavity 62. The transfer tube 68 turns air flow 18 entering radially from the supply tube 66 to impart a circumferential flow component in a direction indicated by arrow 70 shown in FIG. 7. As appreciated, circumferential flow could be clockwise as illustrated in FIG. 7 or counter-clockwise as required to provide desired flow properties of the cooling air flow 18.

The transfer tube 68 includes an axial portion 78 that extends aft of the supply tube 66 toward the low pressure turbine 46. The axial portion 78 transitions into a bend 80 disposed at an angle 82 relative to a line parallel to the engine axis A. The bend 80 turns airflow to generate a significant velocity component in the circumferential direction. The bend 80 is disposed at the angle 82 within a range of between about 30° and about 89° relative to the engine axis A.

Accordingly, the transfer tube 68 imparts a significant velocity component in the circumferential direction of cooling air 18 entering a rear region of the outer cavity 62. The increased flow velocities of circumferentially traveling cooling air 18 increases swirl and circumferential flow components of the cooling air 18 through the outer cavity 62 and into the LPT cavity 86. The faster flow of cooling air 18 through the outer cavity 62 results in reduced temperatures of the cooling air flow 18 entering the LPT cavity 86.

The circumferential flow of cooling air 18 fills the outer cavity 62 quickly by directing air to areas not directly proximate the transfer tube 68. Moreover, the circumferential flow provides a uniform flow of cooling air 18 within the rear region of the outer cavity 68 that stabilizes a temperature of the cooling airflow 18 both within the outer cavity 62 and communicated to the LPT cavity 86 for cooling the case 74 of low pressure turbine 46.

Figure 8:
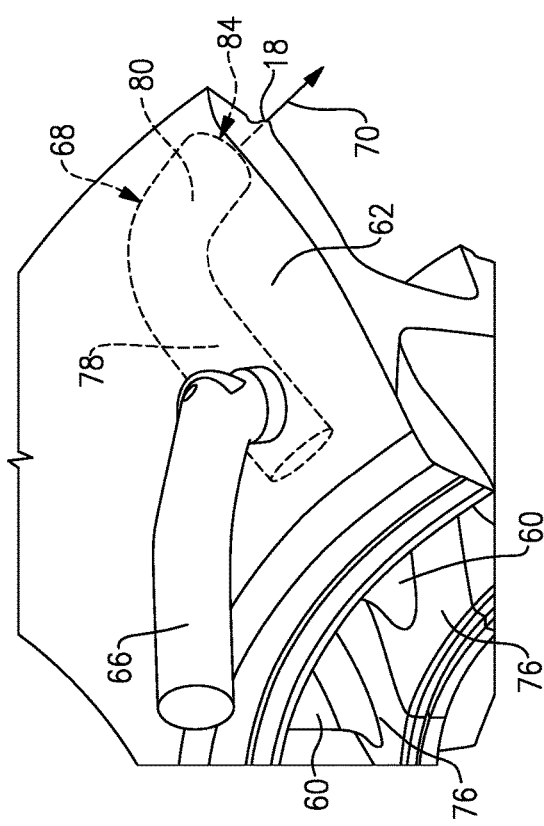
FIG. 8 is a perspective view of the example supply tube and transfer tube within the outer cavity.
Figure 9:
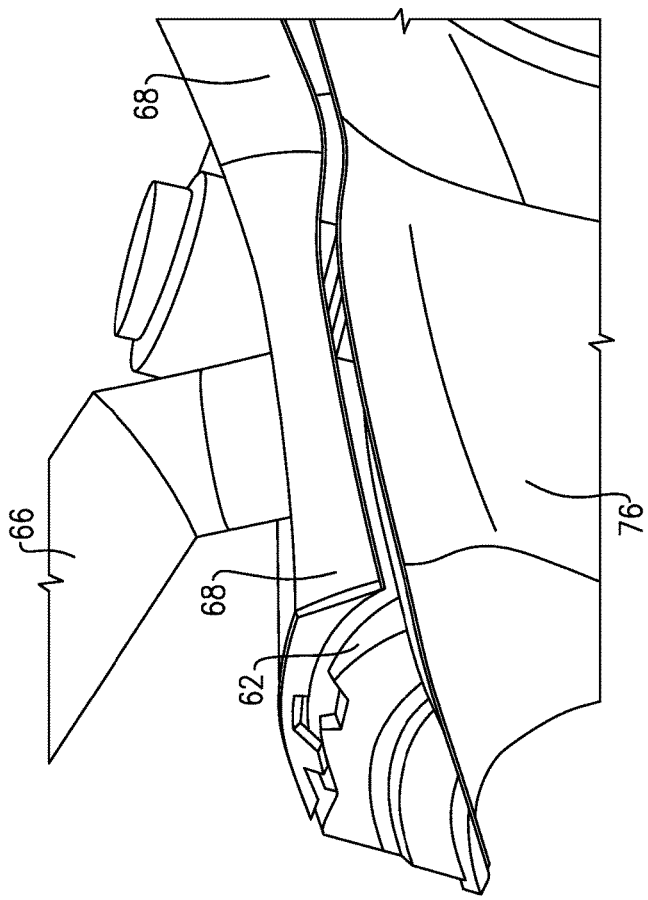
FIG. 9 is a sectional view of the example supply tube and transfer tube.

Referring to FIGS. 8 and 9, with continued reference to FIGS. 5-7, the supply tube 66 supplies cooling airflow 18 radially inward into the transfer tube 68 disposed within the outer cavity 62. The transfer tube 68 turns airflow axially aft in a direction substantially parallel to the engine axis A. The cooling airflow 18 is then turned through the bend 80 in a generally circumferential direction indicated at 70.

The circumferential direction of the cooling airflow generated by the transfer tube 68 increases flow velocity in the circumferential direction that in turn speeds complete filling of the outer cavity 62 and airflow to the LPT cavity 86. The increased flow velocities of cooling airflow 18 through the outer cavity 62 reduce the time cooling airflow 18 is exposed to heat with the cavity 62 resulting in a reduced temperature of cooling air 18 exiting the rear region of the outer cavity 62 and entering the LPT cavity 86.

Accordingly, the increased circumferential flow velocity imparted by the transfer tube 68 provides cooling airflow 18 to the LPT cavity 86 within a desired temperature range.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine, comprising:
    a turbine section including a low pressure turbine and a turbine case disposed about an engine axis, wherein the turbine case includes a turbine cavity;
    a frame assembly defining an outer cavity and an inner cavity, wherein the outer cavity includes at least one opening configured and adapted to communicate cooling air to the turbine cavity within the turbine case; and
    a transfer tube including an axial portion that transitions into a bend portion and that is disposed within the outer cavity and is configured to receive cooling air from a supply tube, the axial portion extending aft towards the turbine section from the supply tube to the bend portion, wherein the bend portion is disposed at an angle relative to a line parallel with the engine axis to impart a circumferential velocity to the cooling air within the outer cavity.

2. The turbine engine as recited in claim 1, wherein the axial portion extends aft from the supply tube in a direction near parallel to the axis.

3. The turbine engine as recited in claim 2, wherein the angle of the bend portion relative to the a line parallel to the engine axis is between 30° and 89°.

4. The turbine engine as recited in claim 1, wherein the transfer tube includes an opening disposed within a distal end of the bend portion.

5. The turbine engine as recited in claim 1, further comprising a compressor section in communication with the supply tube for supplying cooling air to the frame assembly.

6. The turbine engine as recited in claim 5, wherein the compressor section comprises a high pressure compressor and the cooling air is obtained from a front stage of the high pressure compressor.

7. The turbine engine as recited in claim 1, wherein the turbine section includes a high pressure turbine and the frame is a mid-turbine frame which defines a flow path between the high pressure turbine and the low pressure turbine.

8. A frame assembly for a turbine engine, the frame assembly comprising:
a plurality of vane struts extending radially outward relative to an axis;
an outer cavity which includes an opening for communicating cooling air to a turbine cavity disposed within a turbine section aft of the plurality of vane struts; and
a transfer tube including an axial portion that transitions into a bend portion and extends within the outer cavity and is configured and adapted to receive cooling air, the axial portion extending aft from a supply tube toward the turbine section to the bend portion, wherein the bend portion is angled relative to the engine axis to impart circumferential velocity into cooling air within the outer cavity for maintaining a desired temperature of the cooling air within the outer cavity.

9. The frame assembly as recited in claim 8, wherein the supply tube delivers cooling air to the transfer tube.

10. The frame assembly as recited in claim 9, wherein the axial portion extends aft from the supply tube in a direction near parallel to the engine axis.

11. The frame assembly as recited in claim 9, wherein the transfer tube includes an opening disposed within a distal end of the bend.

12. The frame assembly as recited in claim 9, wherein the bend is disposed at an angle within a range of between 30° and 89° degrees relative to the engine axis.

13. The frame assembly as recited in claim 9, including an inner cavity radially inward of the plurality of vane struts, wherein the inner cavity is in communication with the outer cavity.

14. The frame assembly as recited in claim 9, wherein the opening for communicating cooling air to the turbine section comprise a plurality of openings disposed circumferentially within the outer cavity.

15. The frame assembly as recited in claim 9, including a feather seal leak path defined between the outer cavity and the turbine section for supplying cooling air to the turbine section.

16. The frame assembly as recited in claim 9, wherein the supply tube comprises at least two supply tubes communicating cooling air to the outer cavity and the transfer tube comprises at least two transfer tubes in communication with a corresponding supply tube.

* * * * *

UNITED STATES PATENT AND TRADEMARK OFFICE
CERTIFICATE OF CORRECTION

Page 1 of 1

PATENT NO. : 10,087,782 B2
APPLICATION NO. : 14/773876
DATED : October 2, 2018
INVENTOR(S) : Cheng-Zhang Wang et al.

It is certified that error appears in the above-identified patent and that said Letters Patent is hereby corrected as shown below:

In the Claims

In Claim 3, Column 7, Line 10; replace "portion relative to the" with --portion relative to--

In Claim 8, Column 7, Line 30; after "relative to an" insert --engine--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*